(12) United States Patent
Klemmensen et al.

(10) Patent No.: US 6,761,366 B1
(45) Date of Patent: Jul. 13, 2004

(54) MOBILE TOOL CARRIER (75) Inventors: Ramon L. Klemmensen, Cedar Falls, IA (US); Michael E. Hay, Dysart, IA (US); Fred P. Ritchie, Cedar Falls, IA (US); Steven F. Kohagen, Waverly, IA (US)

(73) Assignee: Waterloo Industries, Waterloo, IA (US)

( * ) Notice: Subject to any disclaimer, the term of this patent is extended or adjusted under 35 U.S.C. 154(b) by 197 days.

(21) Appl. No.: 09/873,662

(22) Filed: Jun. 4, 2001

(51) Int. Cl.[7] .................................................. B62B 1/24
(52) U.S. Cl. .................... 280/47.26; 16/113.1
(58) Field of Search ................ 280/43.1, 47.131, 280/47.17, 47.19, 47.24, 47.26, 47.315, 655.1; 16/113.1, 405; 190/39, 115

(56) References Cited

U.S. PATENT DOCUMENTS

| | | | | |
|---|---|---|---|---|
| 4,066,156 A | * | 1/1978 | Basile ........................ 190/18 A |
| 5,011,013 A | | 4/1991 | Meisner et al. |
| 5,431,428 A | * | 7/1995 | Marchwiak et al. ......... 280/655 |
| 5,460,393 A | * | 10/1995 | Tsai ............................ 280/655 |
| 5,464,115 A | * | 11/1995 | Tisbo et al. .................. 220/324 |
| 5,518,139 A | | 5/1996 | Trower et al. |
| 5,522,615 A | * | 6/1996 | Kazmark et al. ............ 280/655 |
| 5,528,453 A | * | 6/1996 | Berman et al. .............. 361/625 |
| 5,575,362 A | * | 11/1996 | Franklin et al. ............. 190/115 |
| 5,581,847 A | * | 12/1996 | Hsieh .......................... 16/113.1 |
| 5,683,097 A | * | 11/1997 | Fenton et al. ............. 280/655.1 |
| 5,876,048 A | * | 3/1999 | Lee ......................... 280/47.315 |
| 5,927,451 A | * | 7/1999 | Tsai ............................ 190/115 |
| 5,988,658 A | | 11/1999 | Ritchie et al. |
| 6,109,627 A | * | 8/2000 | Be ........................... 280/47.19 |
| 6,170,839 B1 | * | 1/2001 | Kizewski ................. 280/47.26 |
| 6,176,559 B1 | * | 1/2001 | Tiramani et al. ............. 312/108 |
| 6,202,254 B1 | * | 3/2001 | Ezer ........................... 16/113.1 |
| 6,247,203 B1 | * | 6/2001 | Kuo ............................ 16/113.1 |
| 6,298,964 B1 | * | 10/2001 | Sadow ....................... 190/18 A |
| 6,347,847 B1 | * | 2/2002 | Tiramani et al. ............. 312/108 |
| 6,371,495 B2 | * | 4/2002 | Thompson .................... 280/30 |

\* cited by examiner

*Primary Examiner*—Brian Johnson
*Assistant Examiner*—Christopher Bottorff
(74) *Attorney, Agent, or Firm*—Calfee, Halter & Griswold, LLP (57) ABSTRACT A portable tool container comprises a molded tub and removable cover with wheels attached to one side of the container on opposite sides of a telescoping handle in a housing that is integrally molded into the container.

13 Claims, 8 Drawing Sheets

MOBILE TOOL CARRIER

BACKGROUND OF THE INVENTION

In a principal aspect the present invention relates to a molded plastic, mobile tool carrier which includes a telescopic handle and wheels for ease of transport.

Tool containers used by workman often serve a multiplicity of purposes. For example, the carrier may be in the form of a tub or container with a removable top and internal trays for storing not only tools, but parts and accessories for tools. Additionally, the removable top may serve as a workbench, a step stool, or a seat. U.S. Pat. No. 5,011,013 for a Portable Storage Container depicts a tool box which may be carried but which does not incorporate an integral carrying mechanism.

Traditionally, the size of such tool carriers is limited by the ability of the workman to move the carrier. However, there have been developed various approaches for attaching wheels to larger carriers in order to transport them. For example, U.S. Pat. No. 5,988,658 for a tool All box carrier discloses one mechanism and method for supporting and transporting a large tool box. U.S. Pat. No. 5,518,139 for a Portable Storage Assembly constitutes another tool carrier unit. Nonetheless, there has remained a need for a large sized tool carrier or tool box which is mobile.

SUMMARY OF THE INVENTION

Briefly, the present invention comprises a tool box fabricated from a molded plastic material. The carrier includes wheels and a telescoping handle to facilitate the movement of the tool box thereby enabling the effective use of a large box. Because the box is larger, it serves as a more convenient and useable work bench, seat or stool. The mobile tool carrier of the invention includes an integrally molded, vertical passage appended to one side. Telescoping handle members are nested in that passage and may be released and extended from the passage for tilting of the carrier onto wheels for easy transport of the tool carrier. Thus a wheel is positioned on each side of the molded passage to provide support of the tool carrier. By positioning the wheels on opposite sides of the telescoping handle and affixed the wheels to the same side of the tool box as the handle, a workman can easily tilt and transport the box or carrier.

Thus it is an object of the invention to provide an improved portable tool carrier.

It is a further object of the invention to provide an improved portable tool carrier which may be made from a molded plastic material wherein a telescoping handle is integrally molded and integrally incorporated in the carrier box.

Yet a further object of the invention is to provide a portable tool carrier with a telescoping handle and which includes a removable top, internal storage trays, and latches for holding the top in position.

Another object of the invention is to provide a portable tool carrier with a telescoping handle that may be placed in a recessed position enabling clear access to the top of the carrier so that it may serve as a seat, a work bench, or a step stool.

Yet a further object of the invention is to provide a portable tool carrier which is economical, easy to use, and is designed to carry a heavy, large load of tools, accessories, and the like, yet which is stable at rest and easily tilted and transported.

These and other objects, advantages, and features of the invention will be set forth in the detailed description which follows.

BRIEF DESCRIPTION OF THE DRAWING

In the detailed description that follows, reference will be made to the drawing comprised of the following figures.

DESCRIPTION OF THE PREFERRED EMBODIMENT

Figure 1:
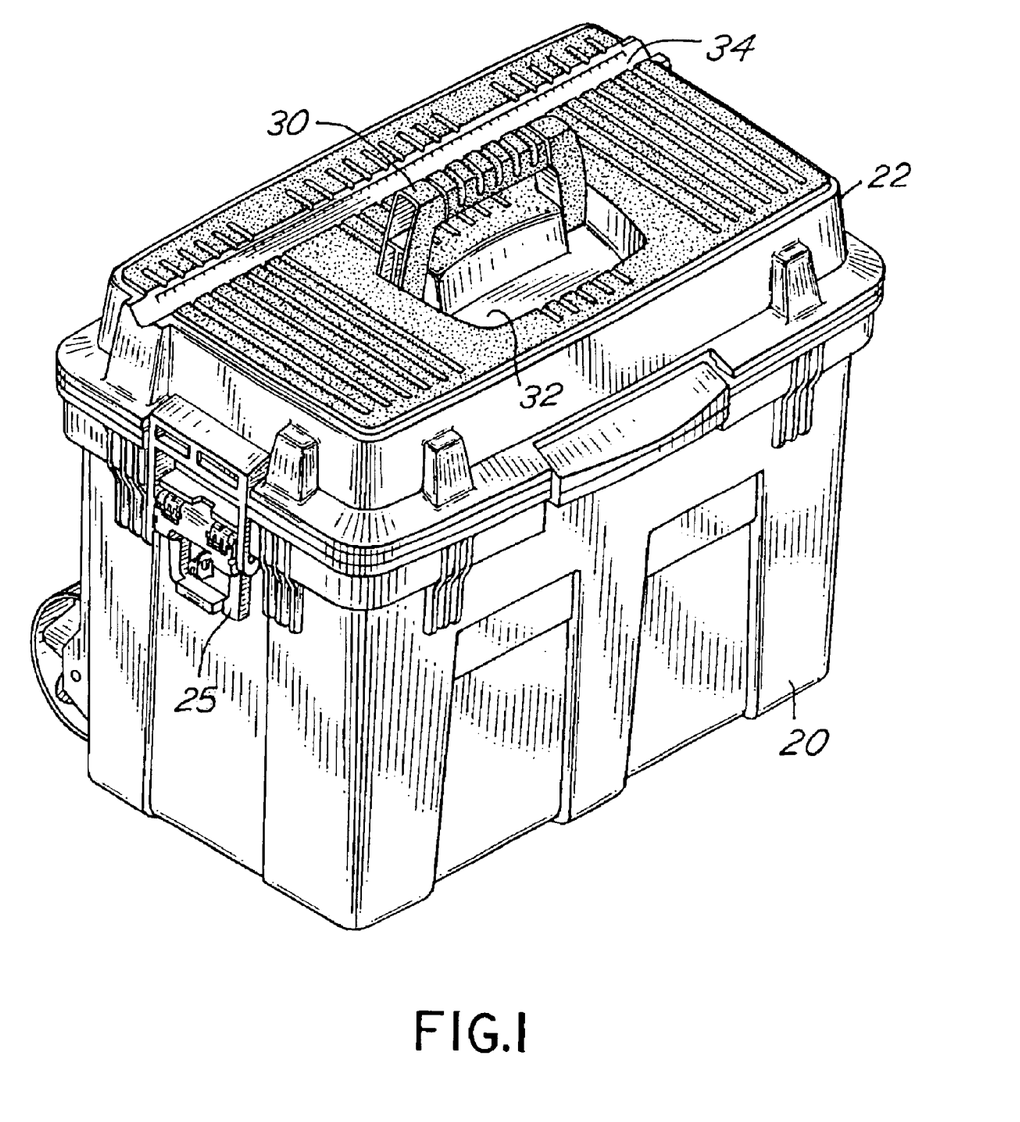
FIG. 1 is an isometric view of the tool carrier.
Figure 2:
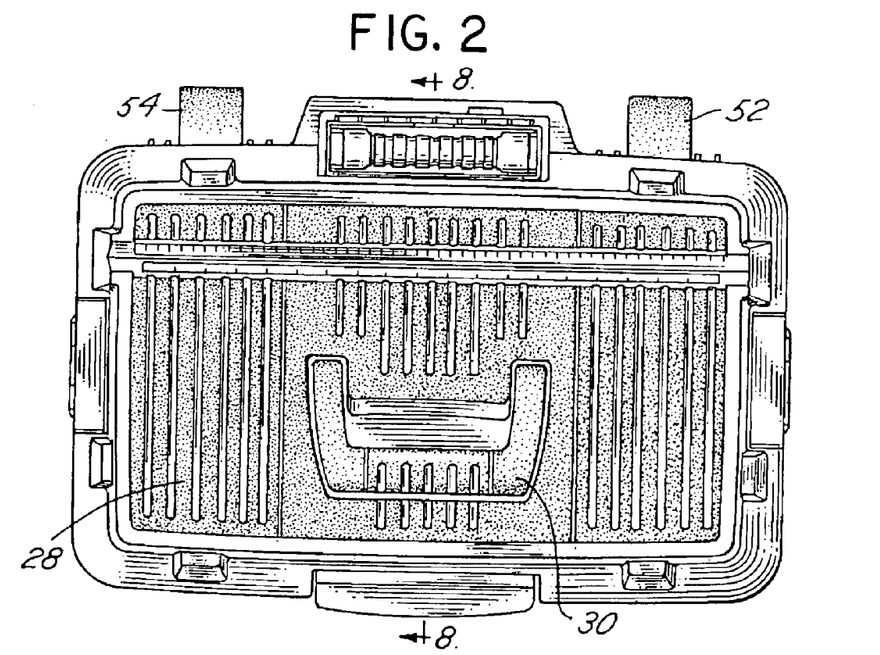
FIG. 2 is a top plan view of the carrier.
Figure 3:
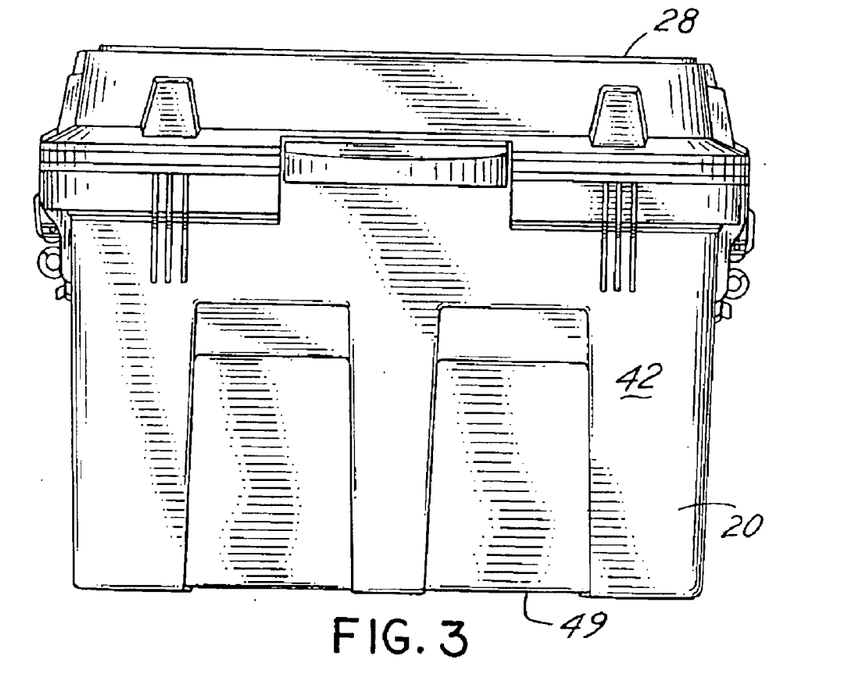
FIG. 3 is a front elevation of the carrier.
Figure 17:
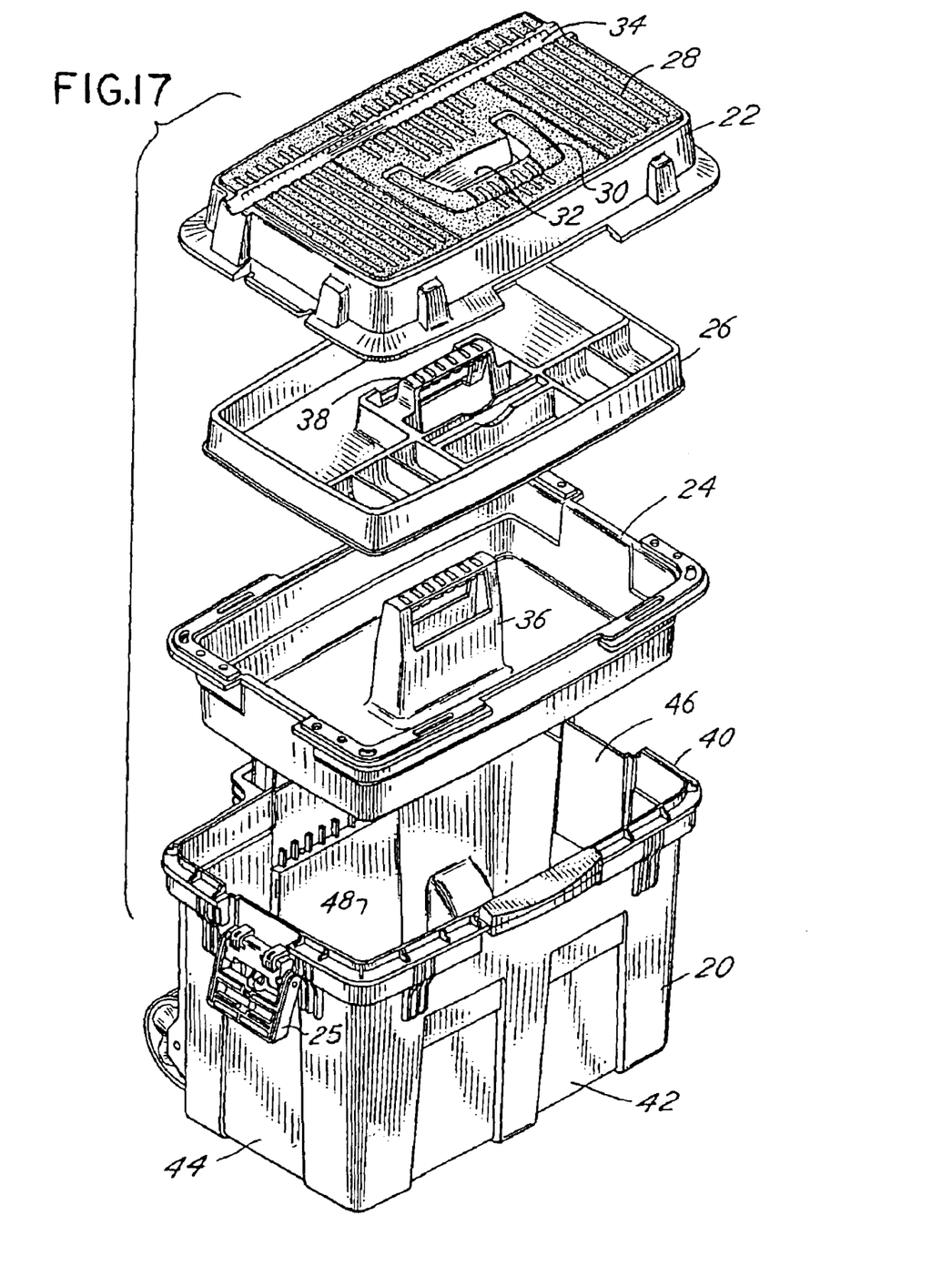
FIG. 17 is an exploded isometric view of the carrier.

Referring to the figures, the toolbox, container or carrier of the invention comprises a molded plastic tub 20 which serves as a carrier or container. Tub 20 has a generally rectangular, parallelepiped shape with an open top for receipt of a cover 22. The cover 22 fits on the open top of the tub or container 20 and is retained thereon by latches, for example, latch 25, in FIG. 1. In the preferred embodiment the carrier includes a series of nesting trays such as tray 24 and tray 26 depicted in FIG. 17. The configuration and construction of the trays 24 and 26 and the manner in which they are assembled to nest within the tub 20 is known to those with skill in the art. Trays 24, 26 are thus depicted by way of example, but not by way of limitation.

The cover 22 includes a generally planar top surface or top 28 which may serve as a seat or work bench. A centrally positioned carrying handle 30 folds into a recess 32 in the top 22 so that items may be placed on the flat, planar surface 28. A channel or trough 34 is provided in top 22 to facilitate retention or holding articles on the carrier when it is being utilized as a workbench. For example, a pipe or a length of lumber may be held or retained within the trough 34.

The nesting trays 24 and 26 typically include interior, centrally located handles 36 and 38, respectively which enable the trays to be carried, lifted, and transported. The trays 24 and 26 also include interior walls that divide the trays 24 or 26 into sections to enable the sorting of items.

The tub or main container 20 includes a peripheral rim 40 which supports the trays 24 and 26 as well as the cover 22. The main container or tub 20 further includes a front side 42, a first lateral side 44, a second lateral side 46, a back side or rear side 48 and a bottom side 49 with depending support pads, e.g. 68, 70, 72. Among the features of the invention which are considered important is the construction of the telescoping handle alone and in combination with the wheel construction which is used to support the tool carrier of the invention thereby enabling the carrier to easily carry additional weight and to be a larger item.

Figure 7:
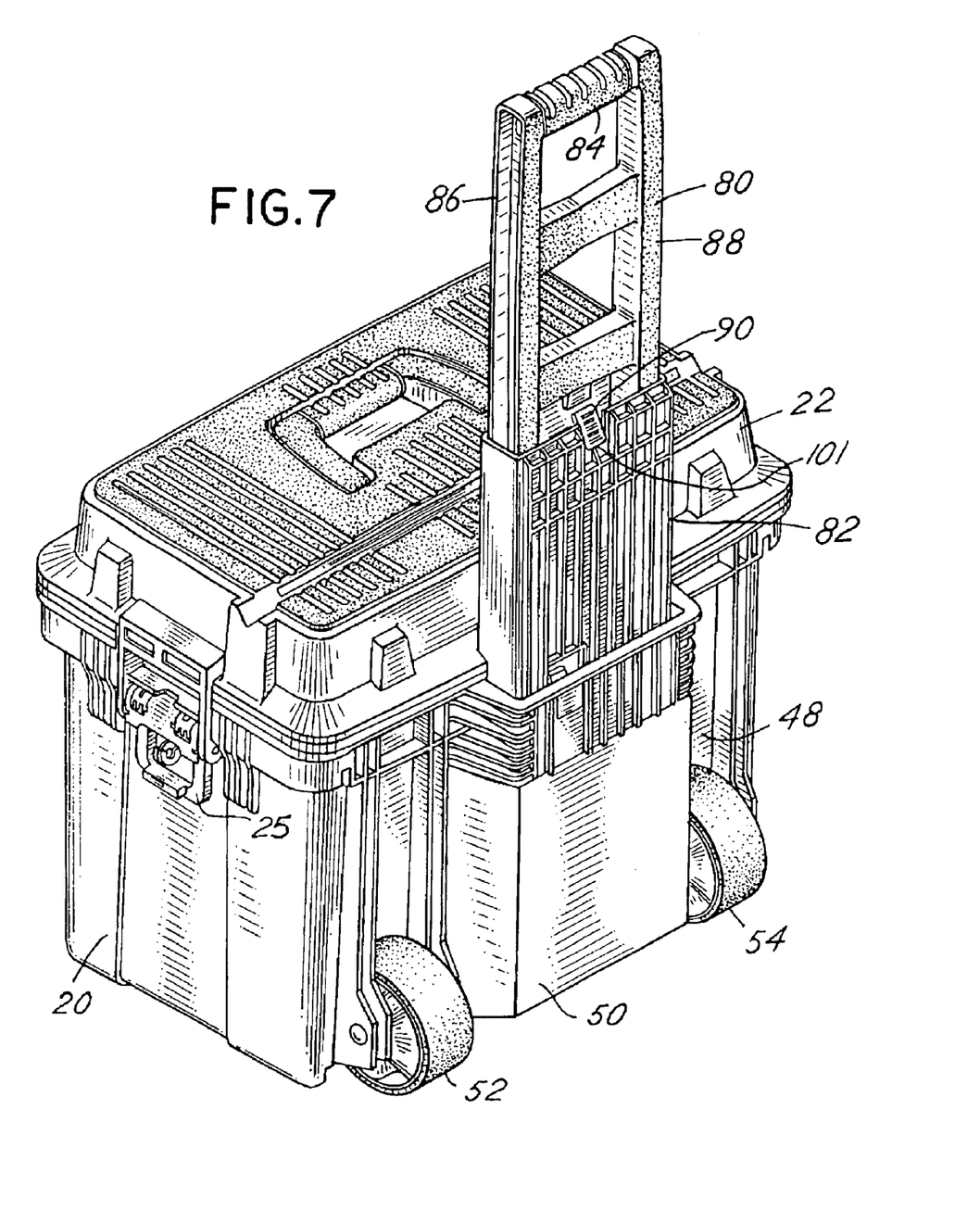
FIG. 7 is an isometric view of the carrier wherein the telescopic handle is in the fully extended position.

Specifically referring to FIG. 7, the telescoping handle is incorporated in a vertical, rectangular cross section open ended passageway 50 that is integrally molded along the midline, vertical axis of the rear or back side 48 of the container or tub 20. A first wheel 52, and a second wheel 54 are positioned respectively on opposite sides of the molded passageway 50. The wheels 52 and 54 are each supported on a separate axle 56 and 58 journaled in brackets 60 and 62, 64, and 66 respectively molded into the back side or rear side 48 of the tub 20. The brackets 60 and 62 for the axle 56 thus are spaced one from the other to support wheel 52.

Figure 5:
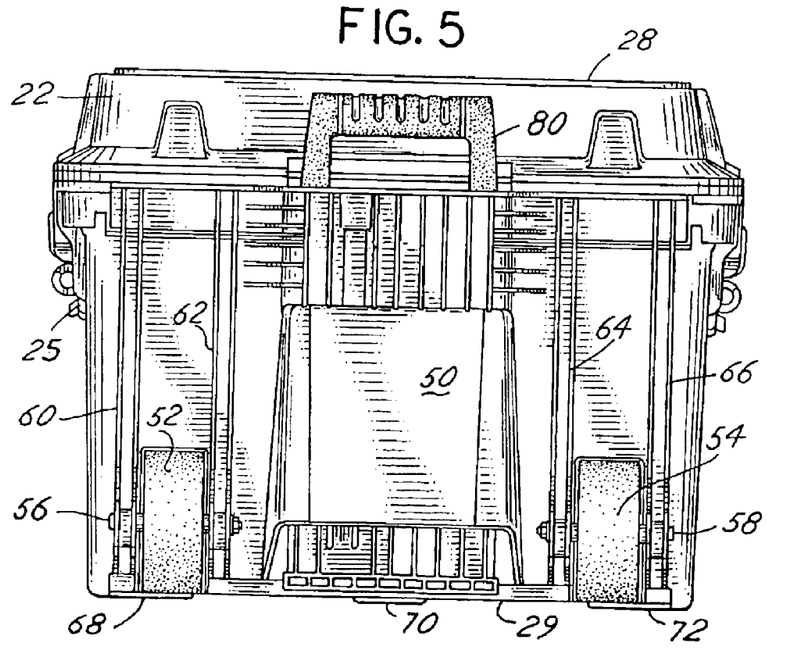
FIG. 5 is a rear elevation of the carrier.

The wheels 52 and 54 have a peripheral outside surface or tread which is generally positioned above the bottom 49 of the nesting container by a slight dimension. This is depicted in FIG. 5 for example. Thus, when the container is in position to serve as a work bench, stool, or the like, support pads 68, 70 and 72 on the bottom 49 of the tub 20 support the tub 20 in a stable manner. The number and position of the pads 68, 70, 72 is subject to the discretion of the maker of the container. When the container is tilted on the wheels 52, 54 at the edge between the rear side 48 and the bottom 49 of the container 20, the wheels 52 and 54 will engage with the floor or support surface, raising the carrier so that the carrier or container may be moved.

The wheels 52 and 54 are widely spaced on opposite sides of the passageway 20 to enhance the stability of the carrier. Thus wheel 52 is positioned close to the lateral side wall 44 and wheel 54 is positioned closed to lateral side wall 46.

Figure 4:
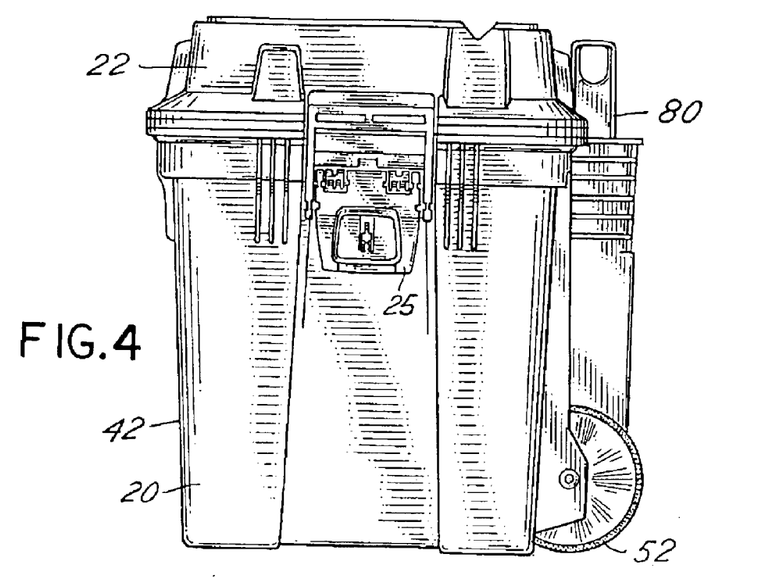
FIG. 4 is a side elevation of the carrier.
Figure 6:
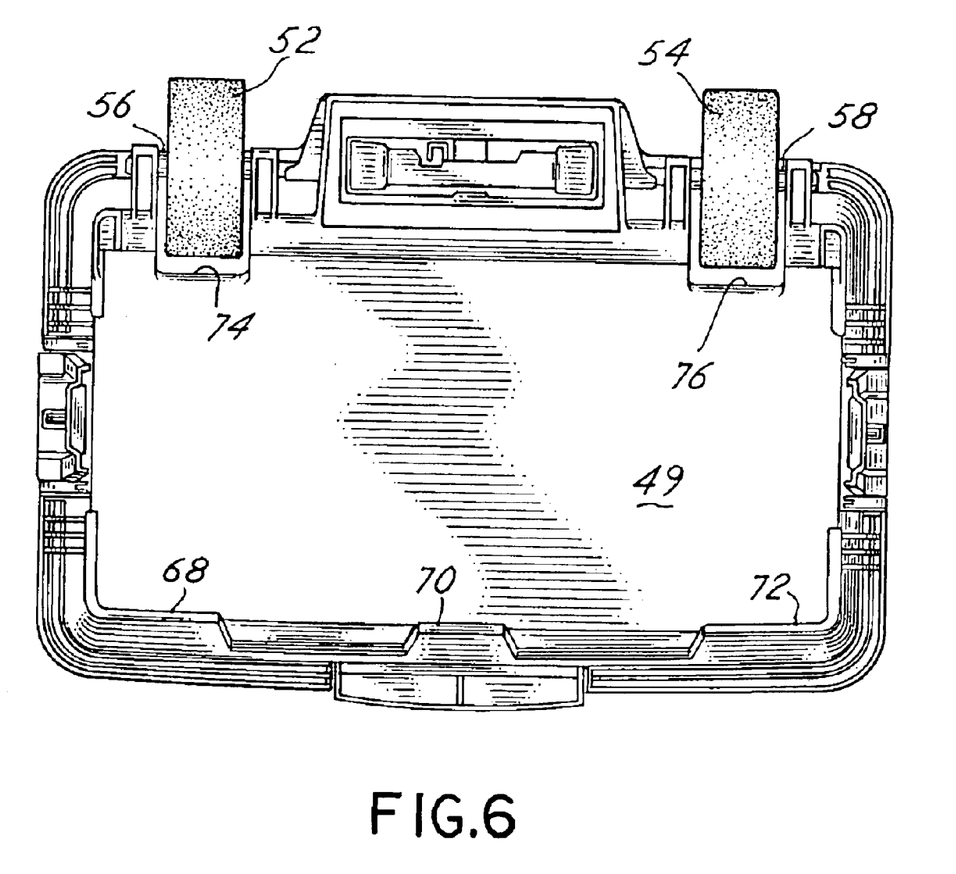
FIG. 6 is a bottom plan view of the carrier.

The wheels 52, 54 are also positioned in a manner which, as depicted in FIG. 6, aligns the axles 56 and 58 horizontally with the peripheral edge of the top of the tub 20. The wheels 52 and 54 thus fit into recesses 74 and 76 formed in the back side 48 and bottom side 49 of the tub or container 20. This further facilitates the stability of the tub or container 20 and enables movement from the position depicted in FIG. 4 by way of example to a tilted position.

The passageway 50 is integrally molded into the rear or back side 48 and is open at both the bottom and top thereof so that telescoping handle members may be assembled by insertion into the passageway 50 and further so that telescoping handle members 80, 82 may be extended upwardly from the passageway 50 as depicted in the Figures. The telescoping handle members 80, 82 are dimensioned so that when they are telescopically recessed such as shown in FIG. 5, they will not project above the level of the top 28 nor below the level of the bottom 49 of the tub or container 20 and cover 22. Thus the handles 80, 82 in the recessed or withdrawn position will not interfere with the use of the tool carrier nor with access to the contents of the tool carrier.

Handles 80, 82 which fit into the molded housing or passageway 50 comprise a first generally rectangular cross section shaped telescoping member 80 nested within a second generally rectangular cross section shaped telescoping member 82. The first member 80 includes a manual cross bar 84 and integrally molded parallel side bars 86 and 88. Member 80 is slidably positioned within the generally rectangular cross section enclosure defined by the second member 82. The second member 82 is slidable in the rectangular cross section housing or passageway 50.

The telescoping members 82 and 80 may be moved to the extended position shown in FIG. 7 merely by engaging the manual cross bar 84 and pulling the cross bar 84 vertically upward. By so doing, the arrangement of cams and levers, stops, detents, and the like, which are incorporated in the telescoping members 80 and 82 and on the inside of the passageway 50, provide for controlled, sequential extension of the members 82 and 80 to the position depicted in FIG. 7 where those members 80, 82 become locked into position and precluded from further upward or downward movement. A single tab or lever 90 may be actuated or depressed to release the locking mechanism enabling the telescoping members 80, 82 to then be sequentially retracted into their recessed position within the passageway 50. Various stops, tabs, cams, detents, and levers control and limit the movement of the telescoping arms 80 and 82 so that they move sequentially and are retained within the passageway 50 and can be extended merely by gripping the manual cross bar 84 and pulling upwardly. The telescoping members 80, 82 being totally enclosed and enshrouded within the passageway 50 are protected and access thereto and pinch points are significantly reduced if not eliminated.

Figure 8:
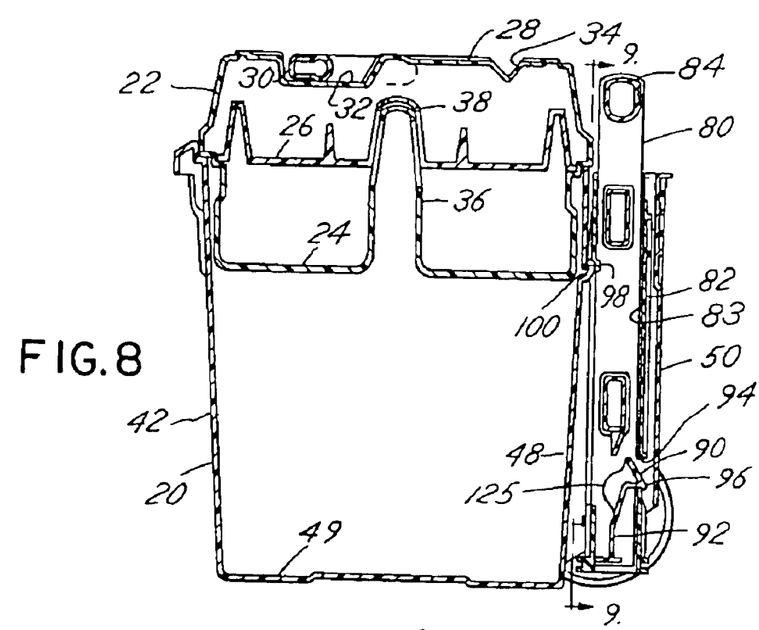
FIG. 8 is a sectional view of the carrier of FIG. 2 taken along the line of 8—8.
Figure 9:
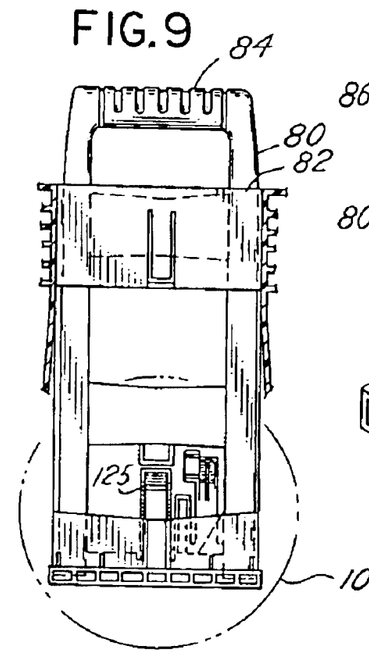
FIG. 9 is a sectional view of the telescoping handle taken along the line of 9—9 in FIG. 8.
Figure 10:
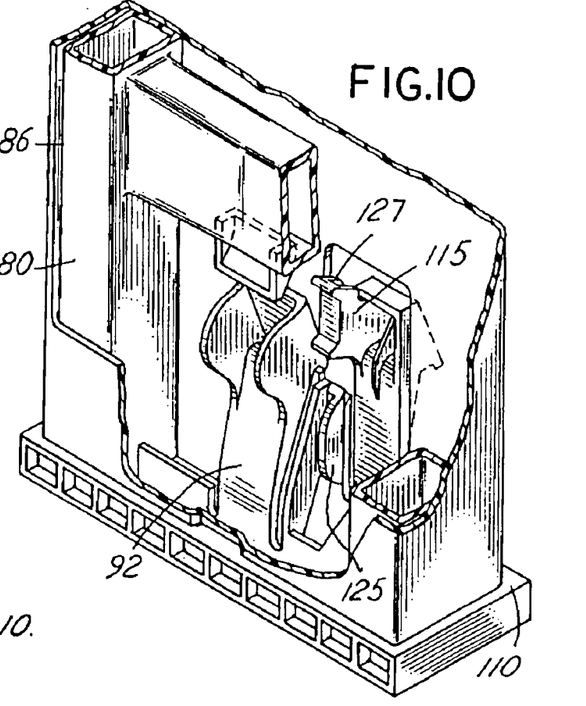
FIG. 10 is an enlarged isometric view of the cam and locking mechanism for the telescoping handle depicted in FIG. 9.
Figure 11:
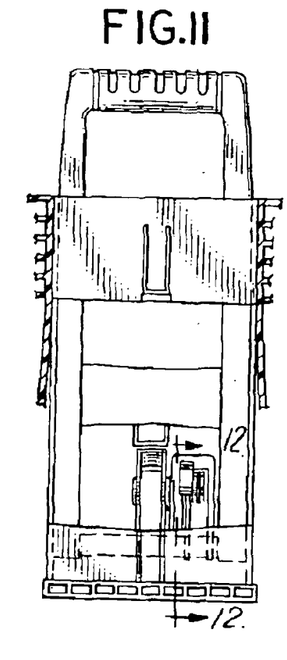
FIG. 11 is a sectional view of the carrier telescoping handle wherein the telescoping handle is partially extended.
Figure 12:
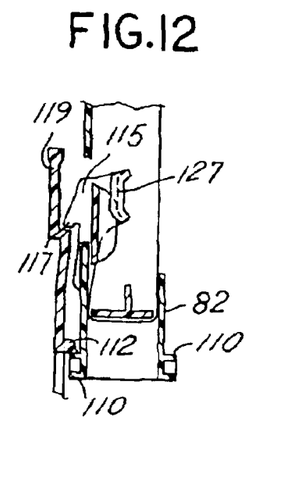
FIG. 12 is a partial cross sectional view of the handle of FIG. 11 taken along the line 12—12.
Figures 13, 14, 15, 16:
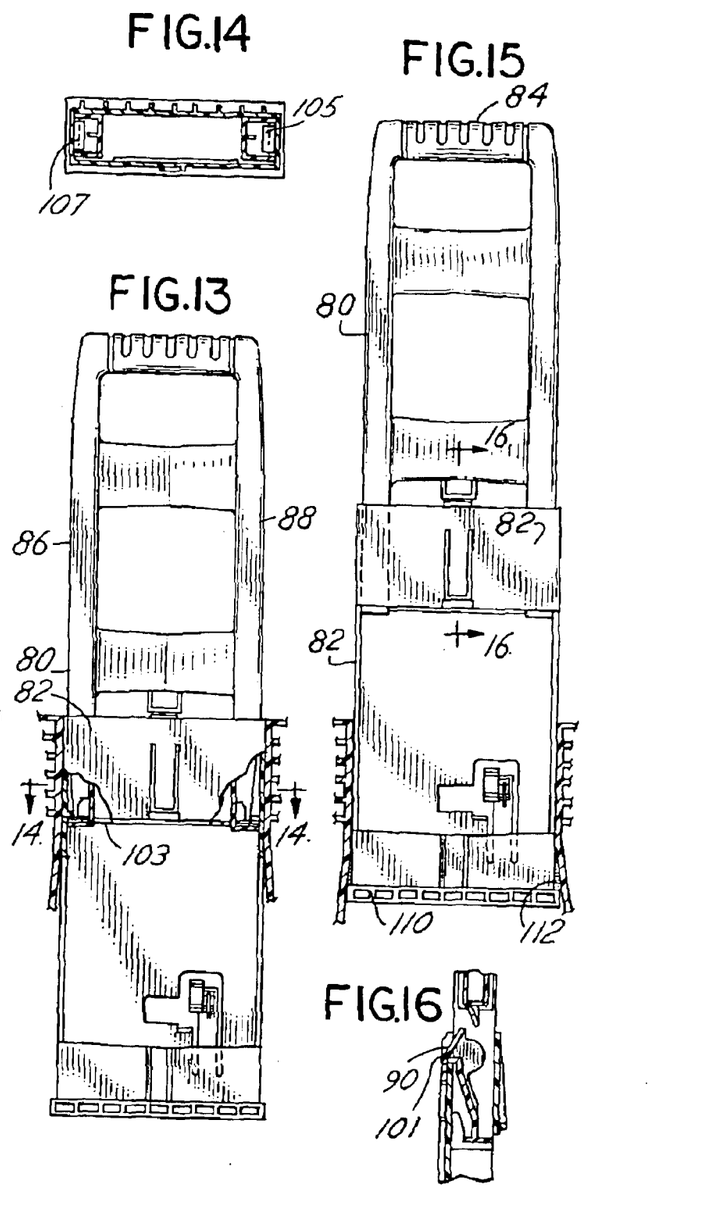
FIG. 13 is a cross sectional view of the carrier handle wherein the telescoping handle is extended further from the passage which houses the handle.
FIG. 14 is a cross sectional view of the mechanism depicted in FIG. 13 taken along the line 14—14.
FIG. 15 is a cross sectional view of the telescoping handle shown in the full extended position.
FIG. 16 is a cross sectional view of the locking mechanism of the telescoping handle of FIG. 15 taken along the line 16—16.

FIGS. 8–16 illustrate in greater detail the sequential detent and latch mechanism associated with the telescopic handles 80 and 82. Referring first to FIG. 8, the first or inner handle 80 is depicted in the recessed position within the second or middle positioned handle member 82 and both of the handle members 80 and 82 are recessed within the through passage or passageway 50 which is integrally molded in the back side or rear side 48 of the container. In the fully recessed position, the first handle or first member 80 includes a tab or lever 90 which is biased laterally by a lever arm 92 outwardly through an opening 94 in the outer side of the second member 82. The lever 90 includes a catch 96 which engages the edge of the opening 94 and precludes further downward movement of the first handle member 80 which is recessed within the second handle member 82.

The recessed or retracted second handle member 82 includes an outwardly projecting rib or lip 98 which engages against an inwardly projecting stop 100 in the back sidewall 48 in passageway 50 (see FIG. 8). These engaging members 98, 100 preclude further downward movement of the retracted second member 82. The weight of the handle members 80, 82 physically maintains them in their lowered, retracted or recessed positions depicted in FIG. 8.

Pulling upwardly on the manual cross bar 84, however, initially moves the recessed first handle member 80 upwardly. Such upward movement is slightly opposed by engagement of the biased lever or tab 90 with the top edge of the opening 94 in handle member 82. However because the biasing member 92 is flexible, the lever or tab 90 is moved out of position and rides against the inner wall 83 of the second member 82, as the first telescoping member 80 rises sequentially within the second member 82.

The first telescoping member 80 may thus rise within the second member 82 whereupon reaching the upper position, the lever or tab 90 will be moved outwardly by the biasing arm 92 to the position shown in FIG. 7 and engage against the top edge 101 (FIG. 7) of a notch at the top of the housing comprising the second member 82. Thus, the first member 80 is thereby precluded from downward movement by the tab or lever 90. Further, upward movement of the first member 80 within the second member 82 is simultaneously precluded by engagement of the bottom end 103 of the first member 80 with inwardly projecting tabs 105 and 107 within the housing defined by the second member 82. Upward travel of the first member 80 is thus limited. The stops 105 and 107 are positioned so that in combination with the tab or lever 90, the first member 80 is effectively locked into full extension of the first member 80 in the second member 82 when the tab or lever 90 moves to the lock position against edge 101 as illustrated in FIG. 7 and the stops 105 and 107 engage against the bottom stop surface 103. Reverse operation of the first member 80 can then only be effected by manually engaging the lever 90 to release the lever from edge 101 to permit downward or retraction movement of the first member 80 into the second member 82.

Once the first member 80 is fully extended in the manner described, further pulling on the first member 80 (bar 84) will cause the second member 82 to extend upwardly in the passageway or channel 50. Such extension of the second member 82 within the passageway 50 is limited upwardly by engagement of a peripheral lower rim 110 of the second member 82 which engages against a peripheral edge 112 on the inside of the passageway 50 as illustrated, for example, in FIG. 12. When the peripheral rib 110 engages against the peripheral ledge 112, a biased latch member 115 on the wall of second member 82 will move upwardly and a latch extension 117 thereon will fit within a molded pocket 119 defined in the passageway 50 (see FIG. 12). Again, the component parts are sized so that when the second member 82 is in the fully extended position, the biased lever or latch 115 will engage in the pocket 119 just as the peripheral rib or rim 110 is stopped by the inwardly extending rib 112. This locks the handle member 82 into immovable position in the extended mode.

To sequentially reverse the process, the tab 90 is released manually and the first handle member 80 is manually retracted or pushed downwardly by engaging the cross bar 84. The first handle member 80 thus retracts into the second handle member 82. Upon such retraction, it is necessary, in order to release the second handle member 82, to release the biased lever 115 from the pocket 119. This is accomplished by engagement of the tab or lever 90 with the lever 115 as the handle member 80 is retracting. That is, the lever 90 includes a cam 125 which projects inwardly therefrom. That cam 125 will engage a camway 127, affixed to the lever 115, as the first member 80 is lowered. This biases the lever 115 inwardly to disengage it from the pocket 119 thereby permitting the second member 82 to be released and lowered inasmuch as the lever 115 has been disengaged from the pocket 119 and the tab 90 moves into engagement with opening 94. The first member 80 thus initially disengages the lever 115 from the pocket 119 and maintains the lever 115 disengaged sufficiently so that the second member 82 may be lowered or driven into the lowered telescopic position in passageway or channel 50.

Consequently, the tab or lever 90 has multiple functions. It functions to retain the first member 80 locked in position in its extended position. It functions to drive and also limit travel of the first member 80 in the second member 82 in the lowered position. Finally, lever 90 serves to release the second member 82 from the passageway 50 as the members 80, 82 are moved from the extended to the retracted period. A single tab or lever 90 thus provides a multiplicity of functions enabling the telescoping assembly to move between the extended and retracted positions easily by being manually controlled merely by a single lever 90 even though there are multiple telescoping sections 80, 82.

It is possible to vary the construction of the invention without departing from the spirit and the scope thereof. Alternative designs of the tub or container 20 as well as the cover 22, the nesting boxes or trays 24 and 26 may be adopted. The size and position of the wheels 50, 52 may all be altered without departing from the spirit and scope of the invention. The telescoping handle members 80, 82 and passageway 50 may be manufactured and attached to the rear side of the container or integrally molded as depicted in the preferred embodiment. The cross sectional shape of the handle members 80, 82 and passage may be varied although the rectangular shape enables use of a cross bar 84 which is easily manually manipulated. Thus the invention is to be limited only by the following claims and equivalents thereof.

What is claimed is:

1. A portable tool container comprising, in combination:
   a molded, generally paralllepiped tab container including a bottom side, a front side, a back side, a first lateral side, a second lateral side, and an open top;
   a telescoping handle mounted on the back side intermediate the first and second lateral sides, said back side including an integrally molded vertical passage on the back side with an open top side, said handle comprising first and second telescoping members slidably mounted in the vertical position;
   said first telescoping member including a cross bar for manual gripping and said second telescoping member comprising a tubular housing for the first telescoping member, the tubular housing including a first projecting stop member projecting outwardly from the housing adjacent the bottom end of the housing and a second stop member projecting outwardly from the housing vertically above the first stop member and spaced from the first stop member to define a distance of telescoping travel of the tubular housing in the passage, said passage including first and second projecting engagement tabs for engagement with the first and second stop members respectively, said first and second engagement tabs spaced a distance equal to the distance of telescoping travel; and
   at least one wheel supporting the container adjacent one side of the handle vertical passage.

2. The container of claim 1 wherein the housing further comprises a biased lever and the passageway includes a pocket for receipt of the biased lever when the housing is in the extended telescoping position to prevent retraction of the housing into the passageway.

3. The container of claim 1 wherein the vertical passage is open at the bottom end and the top end.

4. The container of claim 1 wherein the vertical passage has a vertical dimension less than the vertical dimension of the back side of the container.

5. The container of claim 2 further including a cam member attached to the first member and engageable with the biased lever of the housing to release the biased lever from the pocket upon retraction of the first member from a telescoped extended position in the housing.

6. The container of claim 1 wherein the first member is slidably mounted in the second member, and wherein the first member includes a biased locking arm with an engagement hook, and wherein the second member includes first and second spaced engagement surfaces, said first and second engagement surfaces spaced vertically in the direction of travel of the first member in the second member, whereby the locking arm engages one of the engagement surfaces upon full telescoping extension, and engages the other surface upon full telescoping retraction into the second member.

7. The container of claim 6 further including a housing stop member for engaging the first member upon movement of the full telescoping position to limit further telescoping movement from the housing.

8. The container of claim 6 further including a biasing cam surface in the housing for disengaging the biased locking arm from the housing upon movement of the first member toward the telescoping position.

9. The container of claim 1 wherein the container includes an open top and a cover for the top.

10. The container of claim 1 wherein the container includes one or more molded nesting trays.

11. The container of claim 1 including a cover for the container and a latch mechanism for retaining the cover on the container.

12. A portable tool container comprising:

a container tub having a generally vertical side wall;

a transport wheel attached to the tub for rolling support of the tub;

a telescoping handle attached to the side wall, said side wall including an integrally molded through passage for the handle;

said handle including first and second telescoping members, said second member comprising a housing for the first member, said second member slidably mounted in the through passage, said first member slidably mounted in the second member, said second member and said passage each including projecting stop members which limit the telescopic movement of the second member in the passage, said second member further including a first ledge and a second spaced ledge;

said first member including a first biased stop member for engaging either said first ledge or second ledge of the second member to thereby prevent telescoping movement of the first member in one direction in the housing and said first member further including a projection stop member for engaging the housing for limiting telescopic extension of the first member from the housing, said biased stop member manually engageable and releasable from one of said ledges;

wherein the second member includes a second biased stop member and said side wall includes a pocket for receipt of said second stop member to limit retraction of the second member in the passage.

13. The container of claim 12 further including a cam surface on said second biased member for engagement by a cam driver on the first biased member to release the second stop member from the pocket.

* * * * *